United States Patent Office 3,234,128
Patented Feb. 8, 1966

3,234,128
PLAIN BEARINGS
Francis J. McLeish and George C. Pratt, Wembley, England, assignors to The Glacier Metal Company Limited, Wembley, England, a company of Great Britain
No Drawing. Filed Jan. 9, 1961, Ser. No. 81,249
Claims priority, application Great Britain, Jan. 8, 1960, 825/60
3 Claims. (Cl. 252—12)

This invention relates to plain bearings and materials for making or for incorporating in plain bearings. The term "plain bearings" is to be understood as including any member or assembly having, or designed to have in use, a surface which bears directly or through a liquid or solid lubricant against another surface relatively to which it has sliding movement, irrespective of whether the main or sole purpose is to transmit a load from one to the other of the surfaces having relative sliding movement or whether the sliding contact is solely or partly for some other purpose such, for example, as to provide a seal or to make electrical contact. The term thus includes such members as piston rings, pistons, cylinders and the cages or separators for ball or roller bearings and sliding electrical contact members such as brushes. The term "bearing material" is to be understood as meaning material from which such a bearing could be made, and the term "plain bearing strip" is used to define a strip of such material or a strip comprising a layer of such bearing material secured to a metal backing which may for example be formed into a journal bearing by wrapping, coin pressing or some other known process.

According to the present invention a plain bearing material consists of or includes a mixture comprising a unitary thermo-plastic material with the addition of copper or an oxide or alloy thereof in a proportion representing between 1% and 50% by volume of the whole material, and a proportion representing between 5% to 40% by volume of the whole material consisting of lead and/or an oxide thereof, the total content of the additional materials, (referred to herein as "filler") not exceeding 60% of the whole material.

Preferably the proportion of copper or an oxide or alloy thereof is between 5% and 40% by volume of the whole material, and the copper may be hardened by the addition of tin, zinc, aluminum or silicon to form an alloy.

Where a bearing or bearing material according to the invention includes a filler which is of a metallic content, the metal will preferably be in the form of metal powder or metal fibres, and one preferred form of bearing material according to the invention comprises approximately 60% by volume of polytetrafluoroethylene approximately 10% by volume of bronze consisting of 90% copper and 10% tin in the form of metal powder and approximately 30% by volume of lead in the form of metal powder.

The method of incorporating the fillers into the plastic will depend upon the nature of the plastic. The fillers may be incorporated into most thermo-plastic material by raising the temperature of the thermo-plastic material above its softening temperature and to incorporate the fillers by mastication in, for instance, a rubber mill.

A further method of incorporating the fillers into the plastic material, which would preferably be used in the case of PTFE, is to stir the fillers into a dispersion of very fine particles of the plastics material in a liquid, to maintain the fillers in suspension by stirring, and to coagulate the dispersion.

The invention also includes a plain bearing made from bearing material as set forth above and may be formed by moulding, extruding, hot pressing, casting or otherwise shaping the bearing material.

Alternatively a plain bearing according to the invention may comprise a metal backing having secured thereto a surface layer of the bearing material according to the invention, for example the preferred bearing material set forth above. Thus, in the case of a thermoplastics material the mixture constituting the bearing material could be applied as by rolling at a temperature above the softening temperature of the plastics material on to the exposed surface of a sintered or other porous metallic layer attached to a steel backing strip.

The bearing might comprise for example a steel backing with a porous bronze layer attached to it as by sintering and with the material according to the invention filling the surface pores at least of the bronze layer.

Again a plain bearing according to the invention may comprise a metal backing at least one surface layer of which is itself of porous or pitted form, the pores or pits in such porous or pitted surface layer being substantially filled, as by impregnation, with material according to the invention, e.g. the example of such material given above. Thus the bearing might comprise a metal backing the surface of which has been provided with a porous or pitted layer by phosphating, anodising, or other chemical or electro-chemical process and/or mechanically as by shot blasting with a layer of bearing material attached to it or with the pores or pits filled with such bearing material.

The bearing material may be applied to a metal strip which may be subsequently formed into a journal bearing or bearings by wrapping, coin pressing, stamping or other process in a manner known per se, and the invention includes such bearing strip and bearings made from it.

Two examples of methods of making a plain bearing or plain bearing strip according to the invention will now be described.

Example 1

In this example a plain bearing is made from a plain bearing strip which comprises a metal backing having a surface coated with a layer of bearing material according to the invention. The bearing material in question includes polytetrafluoroethylene (referred to herein as PTFE) and the metal backing is initially mechanically roughened as by shot blasting. The mixture of filler and coagulated PTFE is then applied to the surface of the porous layer by "rolling," sintering of the PTFE being subsequently accomplished by raising its temperature above the transition temperature of 327° C. The plain bearing strip thus produced is then formed into a journal bearing by wrapping, coin-pressing or some other known process.

Example 2

In this example of the invention, bronze or iron powder are shaped under pressure into the required form and then sintered to obtain a porous metallic bush after which a predetermined quantity of the bearing material mixture are impregnated into the inner surface layer of the bush in the following manner:

A hollow tapered mandrel is inserted in the bush and the bearing material according to the invention is first extruded onto the inner surface of the bush through the mandrel thus impregnating the pores of the bush to a relatively small depth, following which the tapered mandrel is advanced through the bush so as to apply a radial pressure to the bearing material to complete the partial impregnation and leave a thin surface layer of the bearing material attached by such partial impregnation to the inner surface of the brush.

The following is an example of a preferred method of preparing plain bearing materials according to the invention, and also describes a method of moulding one of the materials into a bearing.

Example 3

425 grams of −300 mesh lead powder and 110 grams of −300 mesh in tin bronze powder were stirred into a litre of a 15% by weight aqueous dispersion of PTFE. The percentages of the materials were therefore 60% by volume of PTFE, 30% by volume of lead and 10% by volume of bronze. Stirring was continued while the dispersion was coagulated by addition of aluminium nitrate crystals, and the coagulated PTFE was then allowed to settle with the bronze and lead to the bottom of the container. The supernatant water was then poured off to leave a thin PTFE/bronze/lead paste, which was dried. The dried mixture was pressed into sticks at 20,000 lbs. per square inch, and the sticks were ground to a −10 mesh powder. The material was then moulded into bearings at 20,000 lbs. per square inch and sintered at 360° C.

What we claim as our invention and desire to secure by Letters Patent is:

1. A plain bearing material comprising between 40% and 60% by volume of polytetrafluoroethylene, in which is incorporated between 25% and 40% by volume of a filler selected from the group consisting of lead and an oxide of lead, and between 1% and 10% of a filler selected from the group consisting of copper, an oxide of copper, zinc copper alloy, tin copper alloy, aluminum copper alloy, and silicon copper alloy.

2. A plain bearing material comprising between 40% and 60% by volume of polytetrafluoroethylene in which is incorporated between 25% and 40% by volume of red lead oxide, and between 1% and 10% by volume of bronze.

3. A plain bearing material comprising between 40% and 60% by volume of polytetrafluoroethylene in which is incorporated between 25% and 40% by volume of lead, and between 1% and 10% by volume of bronze.

References Cited by the Examiner

UNITED STATES PATENTS

| | | | |
|---|---|---|---|
| 2,332,733 | 10/1943 | Legnian | 29—182.3 X |
| 2,416,480 | 2/1947 | Henry et al. | 252—12 |
| 2,581,301 | 1/1952 | Saywell | 252—26 |
| 2,585,430 | 2/1952 | Boegehold | 29—191.2 X |
| 2,689,380 | 9/1954 | Tait | 29—191.2 X |
| 2,691,814 | 10/1954 | Tait | 29—149.5 |
| 2,698,966 | 1/1955 | Stott et al. | 252—12 |
| 2,400,099 | 5/1956 | Brubaker et al. | 252—12 |
| 2,777,783 | 1/1957 | Welsh | 29—149.5 |
| 2,799,080 | 7/1957 | Duckworth | 29—182.3 |
| 2,807,510 | 9/1957 | Schubert et al. | 308—238 |
| 2,824,060 | 2/1958 | White | 252—12 X |
| 2,865,692 | 12/1958 | Gossmann | 308—238 |
| 2,956,848 | 10/1960 | St. Clair | 252—12 X |
| 3,122,505 | 2/1964 | Rulon-Miller et al. | 252—12 |

DANIEL E. WYMAN, *Primary Examiner.*
CARL F. KRAFFT, *Examiner.*
R. J. ROCHE, R. E. HUTZ, E. W. GOLDSTEIN, P. P. GARVIN, *Assistant Examiners.*